Patented Dec. 19, 1939

2,183,870

UNITED STATES PATENT OFFICE 2,183,870

DYESTUFFS OF THE NAPHTHALENE SERIES

Rudolf Robl, Ludwigshafen-on-the-Rhine, Germany, assignor to General Aniline Works, Inc., New York, N. Y., a corporation of Delaware No Drawing. Application March 1, 1938, Serial No. 193,288. In Germany March 4, 1937

4 Claims. (Cl. 260—396)

The present invention relates to dyestuffs of the naphthalene series.

It is known that in the preparation of naphthazarine from 1,5-dinitronaphthalene there is formed a compound which dissolves in dilute sulphuric acid giving a blue coloration which compound is usually named naphthazarine intermediate product (cf. Berichte der Deutschen Chemischen Gesellschaft, vol. 4, page 439). It is also known that this so-called naphthazarine intermediate product may be prepared according to the methods described in the German Patents Nos. 101,371, 108,551 and 111,683.

I have now found that the naphthazarine intermediate product may also be obtained by increasing the pH value of the solution obtained by the reduction of the 1,5-dinitronaphthalene in sulphuric acid and dilution with water. It was observed that the naphthazarine intermediate product thus prepared agrees in its properties with the product obtainable according to the said German Patent No. 111,683, but there is a certain difference in comparison with the product obtained according to the said other German Patents Nos. 101,371 and 108,551. This difference becomes evident from the form of the crystals which are obtained by treating the products obtained according to one of the methods of the said German patents with sodium hydrosulphite in a 10 per cent sodium carbonate solution. The two products are most probably isomeric bodies which differ from each other by the position of the double bonds. It has been suggested to react the naphthazarine intermediate product obtained by any of the said known processes with aromatic amines. The condensation products thus obtainable may be used for dyeing cellulose esters and ethers. These dyestuffs, however, have the disadvantage that they have very little fastness to washing and against water.

I have further found that dyestuffs of very good fastness to water and washing are obtained if both isomeric forms of the naphthazarine intermediate product are reacted with benzyl ethers of para-aminophenol. These new dyestuffs are similar to the known dyestuffs in that they are fast to light and capable of being discharged. It is, however, very surprising that the particular new dyestuffs are substantially superior to the known dyestuffs in their fastness to washing and against water.

The new dyestuffs are obtained, for example, by adding a solution of a benzyl ether of para-aminophenol to a suspension of the naphthazarine intermediate product in sodium carbonate solution and heating the mixture in the presence of a reducing agent such as sodium hydrosulphite.

The following example will further illustrate how the said invention may be carried out in practice but the invention is not restricted to this example. The parts are by weight.

Example 6 parts of the naphthazarine intermediate product obtained according to the German Patent 108,551 are suspended in 110 parts of 10 per cent sodium carbonate solution and heated for some time at from 30 to 40° C. in the presence of 9 parts of sodium hydrosulphite. Then a solution of 6 parts of para-aminophenol benzyl ether in 12 parts of ethanol is added and the mixture is heated while stirring in a closed vessel for some time at from 40° to 60° C. The mixture is then diluted with water and a little sodium hydroxide solution, and then air is led through. The compound precipitated is filtered off by suction, treated with a little dilute hydrochloric acid in order to remove any unchanged amino compound. The residue is washed with water and dried or made into a paste in the usual manner.

The dyestuff thus obtained dyes cellulose esters and ethers greenish blue shades capable of being discharged which are fast to light and are distinguished by a very good fastness to water and washing.

A very similar dyestuff is obtained if as starting material the compound is used obtained by increasing the pH value of the blue solution obtained by reducing 1,5-dinitronaphthalene in sulphuric acid and diluting with water.

Instead of para-aminophenolbenzyl ether its substitution products containing in the nucleus of para-aminophenol halogen atoms or alkyl groups may be reacted in a similar manner with the two isomeric naphthazarine intermediate products, dyestuffs of similar good properties being obtained.

What I claim is:

1. A process of producing a dyestuff particularly suitable for dyeing acetate artificial silk which consists in reacting the naphthazarine intermediate product in the presence of a reducing agent with para-amino-phenol-benzyl-ethers and oxidizing the leuco compound formed.

2. A process of producing a dyestuff particularly suitable for dyeing acetate artificial silk which consists in reacting the naphthazarine intermediate product in the presence of sodium hydrosulfite and an alkali metal carbonate with para-amino-phenol-benzyl ethers and oxidizing the leuco compound formed.

3. A green coloring matter prepared by the interaction of the naphthazarine intermediate product and para-amino-phenol-benzyl-ethers in the presence of a reducing agent and oxidizing the leuco compound formed, said coloring matter being usable for dyeing cellulose derivatives and being insoluble in water.

4. A green coloring matter prepared by interaction of the naphthazarine intermediate product and the para-amino-phenol-benzyl-ether in the presence of a reducing agent and oxidizing the leuco compound formed, said coloring matter being usable for dyeing cellulose derivatives and being insoluble in water.

RUDOLF ROBL.